United States Patent [19]
Takai

[11] Patent Number: 6,078,972
[45] Date of Patent: Jun. 20, 2000

[54] CONTROL SYSTEM OF FIFO MEMORIES

[75] Inventor: Kazuhito Takai, Tokyo, Japan

[73] Assignee: NEC Corporation, Tokyo, Japan

[21] Appl. No.: 08/963,012

[22] Filed: Nov. 3, 1997

[30]     Foreign Application Priority Data

Nov. 6, 1996   [JP]   Japan .................................. 8-293055

[51] Int. Cl.[7] .............................. G06F 13/00; G06F 3/00
[52] U.S. Cl. ................................ 710/69; 710/20; 710/21; 710/131; 711/148
[58] Field of Search ................................ 710/20, 21, 31, 710/38, 62, 63, 64, 69, 70, 129, 131; 711/147, 148, 150

[56]              References Cited

U.S. PATENT DOCUMENTS

| 5,535,356 | 7/1996  | Kim et al. ................................ 711/103 |
| 5,550,566 | 8/1996  | Hodgson et al. ........................ 345/202 |
| 5,680,151 | 10/1997 | Grimm et al. ........................... 345/119 |
| 5,748,984 | 5/1998  | Sugita ....................................... 710/69 |
| 5,835,787 | 11/1998 | Raffman et al. .......................... 710/21 |
| 5,900,830 | 5/1999  | Scheffler ................................. 341/123 |

FOREIGN PATENT DOCUMENTS

| 61-180338 | 11/1986 | Japan . |
| 62-232246 | 12/1987 | Japan . |

OTHER PUBLICATIONS

Traffic Management Specification Version 4.0, The ATM Forum, Mar. 1996.

*Primary Examiner*—Ayaz R. Sheikh
*Assistant Examiner*—Raymond N Phan
*Attorney, Agent, or Firm*—J. Warren Whitesel; Laff, Whitesel & Saret

[57]                ABSTRACT

To reduce access frequency to a CPU for recording/reproducing digital audio data, a control system of FIFO memories of the invention applied to an sound codec apparatus comprises means (2, 4, 7, 9 and 10) for controlling a first and a second FIFO memory (3 and 8) to store recording data sequentially and to output stored recording data sequentially when the apparatus is used exclusively for recording; and controlling the first and the second FIFO memory to store the reproducing data sequentially and to output the stored reproducing data sequentially when the apparatus is used exclusively for reproducing.

3 Claims, 6 Drawing Sheets

CONTROL SYSTEM OF FIFO MEMORIES

BACKGROUND OF THE INVENTION

The present invention relates to a control system of first-in-first-out (hereafter abbreviated as FIFO) memories, and more particularly to a control system of FIFO memories used for recording/reproducing audio signals.

The FIFO memories have been used in audio interface units for recording/reproducing audio signals without interruption, whereof examples are disclosed in a Japanese utility model registration application laid open as a Provisional Publication No. 180338/'86 and a Japanese patent application laid open as a Provisional Publication No. 232246/'87.

FIG. 6 is a block diagram illustrating an example of the conventional FIFO memory control systems applied to a sound codec device. Referring to FIG. 6, audio signals are input from a microphone 101 to an A/D (Analog to Digital) converter 102. Output of the A/D converter 102 is input to an input FIFO memory 103. A CPU 104 receives data from the input FIFO memory 103. The CPU 104 delivers data to an output FIFO memory 107, output thereof being input to a D/A (Digital to Analog) converter 106. Output of the D/A converter 106 is supplied to a speaker 105 to reproduce audio output.

The FIFO memories are used as follows.

In recording operation, a sound signal output of the microphone 101 is converted into digital data through the A/D converter 102, which are stored in the input FIFO memory 103. Then, at a timing when the input FIFO memory 103 is filled with the digital data, they are read out by the CPU 104 at once. The sampling frequency of the A/D converter, which converts the sound signal from the microphone 101, is about several ten KHz, while the transfer bit rate of the CPU 104 is, generally, about several ten MHz. Therefore, all the digital data stored in the input FIFO memory can be transferred to the CPU 104 within one sampling interval of the sound signal without missing any sampling, on condition the input FIFO memory 103 is not too large.

In reproduction operation, an amount of digital data to be reproduced for filling the output FIFO memory 107 are transferred at once from the CPU, which are read out successively to be converted into analog signals by the D/A converter 106 to be reproduced. At each timing when all the digital data in the output FIFO memory 107 are read out, the same amount of the digital data are transferred from the CPU 104 repeatedly until all the reproduction data are transferred. Here, also in the reproduction, the digital data in the output FIFO memory 107 can be reproduced without interruption, since each data transfer, at the transfer bit rate of several ten MHz, is performed within an interval for reading out successive sampled data.

However, usage of each of the FIFO memories is fixed for each of sound recording and sound reproduction, in the conventional FIFO memory control systems. Therefore, the input FIFO memory 103 is left unused when the sound codec is used only for sound reproduction, while the output FIFO memory 107 is left unused when the sound codec is used only for sound recording. This is a problem.

SUMMARY OF THE INVENTION

Therefore, a primary object of the present invention is to provide a control system of FIFO memories to be applied to an interface unit for recording and reproducing an audio signal, wherein two FIFO memories can be flexibly used, both for data input, for example, according to operational mode of the interface unit, for improving data transfer efficiency of the interface unit when it is used exclusively for either of the sound recording or the sound reproduction.

In order to achieve the object, a control system of FIFO memories applied in an apparatus for recording first digital audio data converted from a first analog signal and reproducing a second analog signal converted from second digital audio data comprises control means for:

controlling a first FIFO memory and a second FIFO memory to store the first digital audio data sequentially and to output the first digital audio data stored in the first FIFO memory and the second FIFO memory sequentially when the apparatus is used exclusively for recording the first digital audio data;

controlling the first FIFO memory and the second FIFO memory to store the second digital audio data sequentially and to output the second digital audio data stored in the first FIFO memory and the second FIFO memory sequentially when the apparatus is used exclusively for reproducing the second digital audio data; and controlling each of the first FIFO memory and the second FIFO memory to store each of the first digital audio data and the second digital audio data, respectively, and to output corresponding each of the first digital audio data and the second digital audio data stored in said each of the first FIFO memory and the second FIFO memory, respectively, when the apparatus is used for recording the first digital audio data and reproducing the second digital audio data simultaneously.

Therefore, the data transfer efficiency of the apparatus from/to the CPU, namely, overhead of the CPU, can be improved by reducing access frequency to the CPU, in the invention, making use of both of the first FIFO memory and the second FIFO memory sequentially when the apparatus is used exclusively for recording or reproducing digital audio data.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Now, embodiments of the present invention will be described in connection with the drawings.

Figure 1:
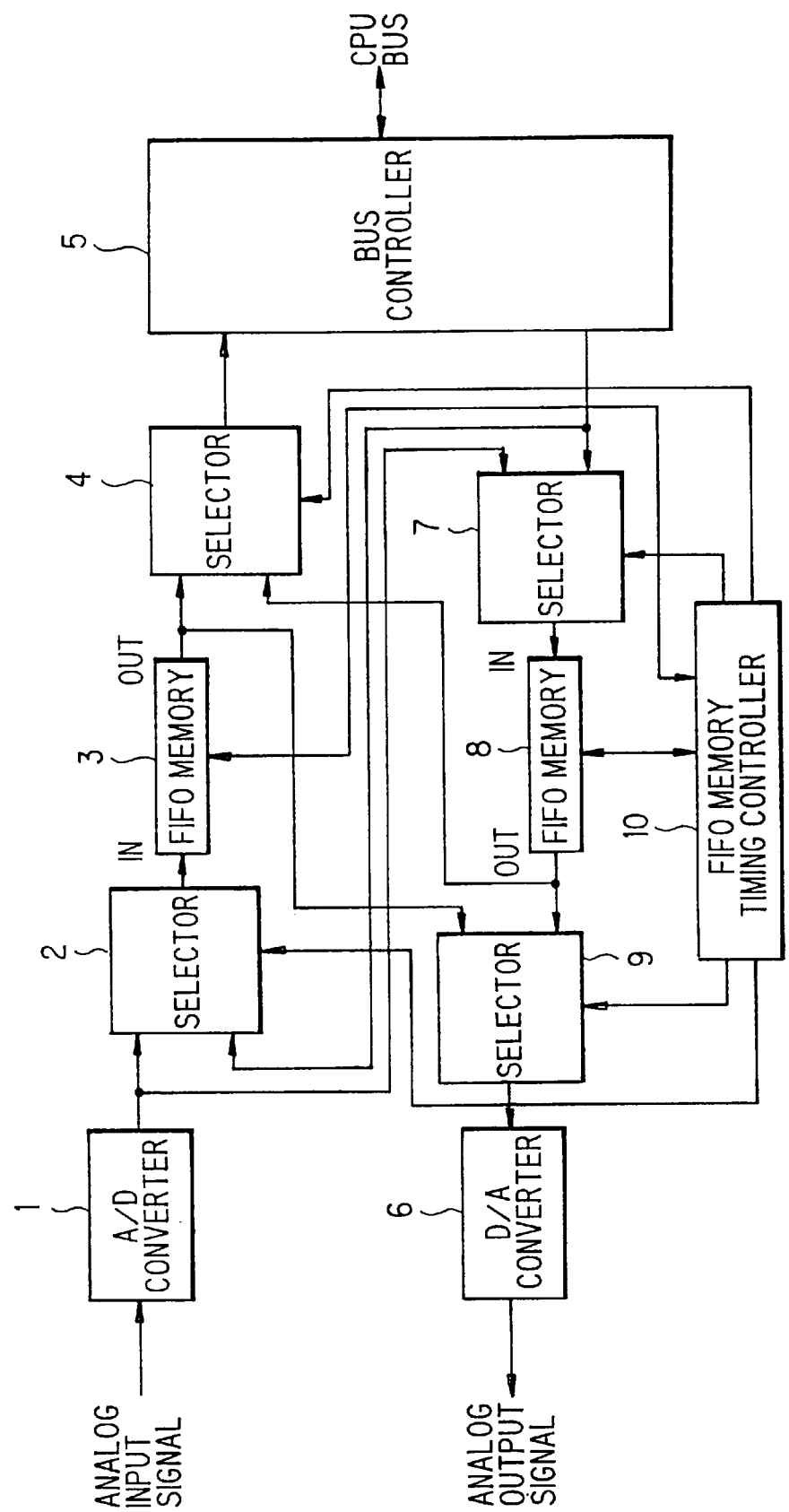
FIG. 1 is a block diagram illustrating an embodiment of the invention.

FIG. 1 is a block diagram illustrating an embodiment of the invention, wherein comprised;

an A/D converter 1 for converting an analog input signal into a digital signal, a pair of FIFO memories 3 and 8 each for storing digital data supplied and outputting them successively in the order according to which they are supplied, a D/A converter 6 for converting a digital signal into analog signal to be output, a first to a fourth selector 2, 4, 7 and 9 each for selecting one of two inputs, a FIFO memory timing controller 10 for controlling the first to the fourth selector 2, 4, 7 and 9, and a bus controller 5 for taking charge of interface with a CPU (not depicted in FIG. 1).

The A/D converter 1 samples the analog input at a sampling frequency of at most 48 KHz and quantizes it into 16 bit data, for example, which are supplied to a first input terminal of the first selector 2 and a first input terminal of the third selector 7. Output of the first selector 2 is supplied to the first FIFO memory 3 having a memory space of 16×16 bits, for example. Output of the first FIFO memory 3 is connected to a first input terminal of the second selector 4 and a first input terminal of the fourth selector 9.

Output of the third selector 7 is supplied to the second FIFO memory 8 having also a memory space of 16×16 bits, in the example. Output of the second FIFO memory 8 is connected to a second input terminal of the second selector 4 and a second input terminal of the fourth selector 9.

The D/A converter 6 converts 16 bit data supplied from the fourth selector 9 into an analog output signal to be output to external according to a clock signal having a frequency of at most 48 KHz.

The bus controller 5, having a bi-directional 16 bit buffer, for example, receives data selected by the second selector 4 for transferring the data to the CPU through bus lines having a bit width of 16 bits, in the example, when controlled in a recording mode. When the bus controller 5 is controlled in a reproduction mode, it receives 16 bit data transferred from the CPU to the contrary, and outputs them to a second input terminal of the first selector 2 and a second input terminal of the third selector 7.

Figure 2A:
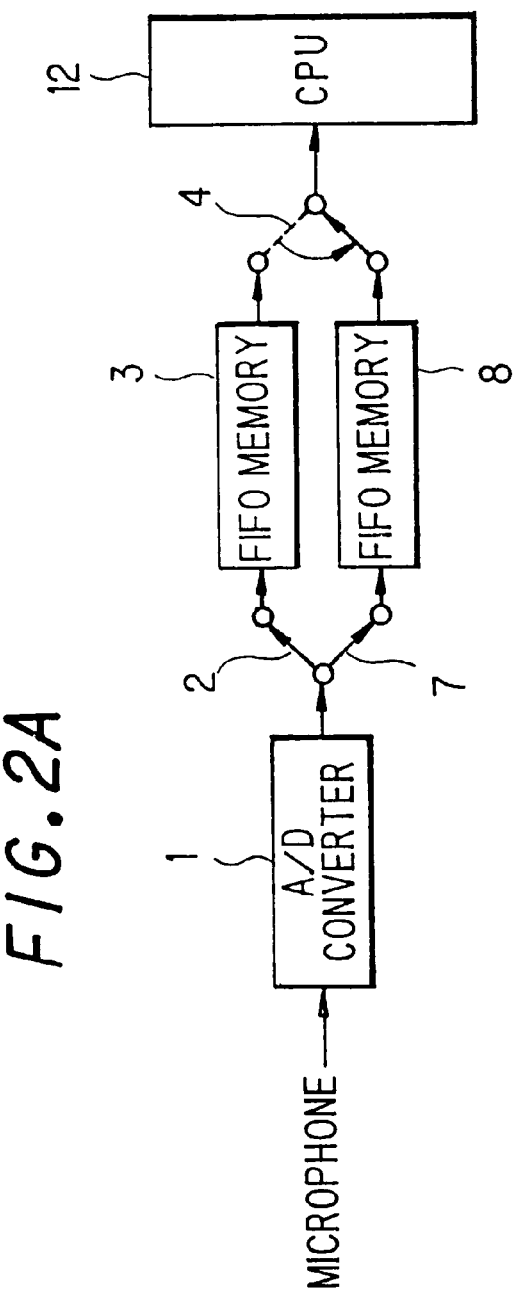
FIG. 2A is a schematic diagram illustrating control of the first to the fourth selector 2, 4, 7 and 9 of FIG. 1 in a recording mode.
Figure 2B:
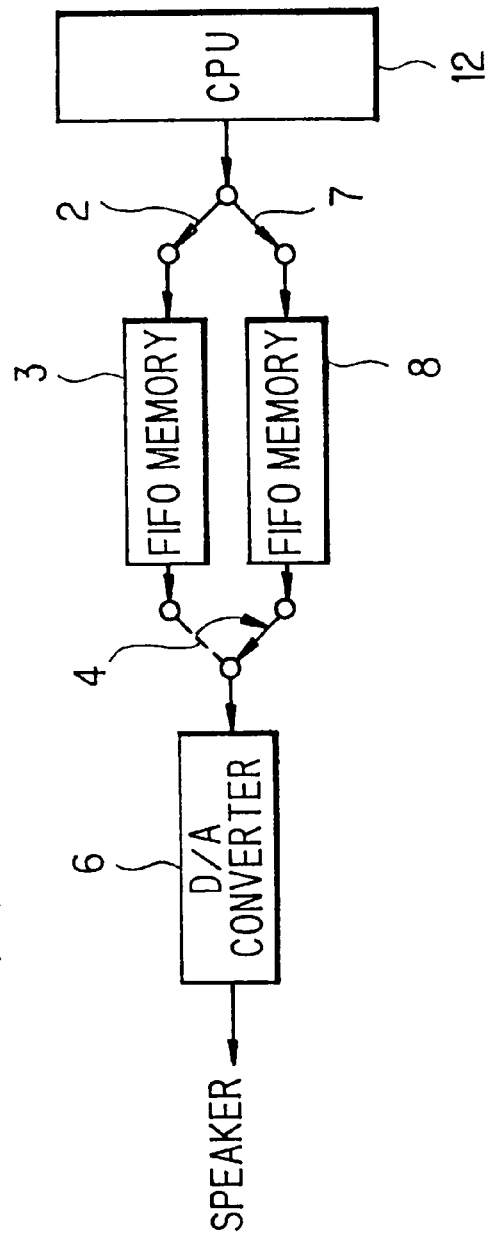
FIG. 2B is a schematic diagram illustrating control of the first to the fourth selector 2, 4, 7 and 9 of FIG. 1 in a reproduction mode.

Now, usage of the first and the second FIFO memory 3 and 8 is described referring to schematic diagrams of FIG. 2A and FIG. 2B illustrating control of the first to the fourth selector 2, 4, 7 and 9.

Referring to FIG. 2A, both the first and the second selector 2 and 7 are controlled to select the 16 bit data output from the A/D converter 1 in the recording mode, while they are controlled to select the 16 bit data transferred from the CPU 12 when controlled in the reproduction mode as shown in FIG. 2B. Write clock signal of the first and the second FIFO memory is controlled by the FIFO memory timing controller 10 to enabling writing operation firstly of the first FIFO memory 3, which is followed by the writing operation of the second FIFO memory 8 after the first FIFO memory 3 is filled with new data, synchronized with the sampling frequency of the A/D converter 1 in the recording mode, or synchronized with data transfer rate of the 16 bit parallel data from the CPU 12 in the reproduction mode. Thus, the first and the second FIFO memory 2 and 8 are sequentially filled with new data from the A/D converter 1 or the CPU 12.

On the other hand, the second and the fourth selector 2 and 9 are controlled as follows.

After the first and the second FIFO memory 2 and 8 are filled with new data as above described, the second selector 4 is firstly controlled to select output of the first FIFO memory 3 to be transferred to the CPU 12 in the recording mode, and then, after data of the first FIFO memory 3 are all read out, it is controlled to select output of the second FIFO memory 8, as shown in FIG. 2A. Read clock signal synchronized with the data transfer rate to the CPU 12 is controlled to be supplied selected one of the first and the second FIFO memory 3 and 8.

In the reproduction mode, the fourth selector 9 is controlled in place of the second selector 4 in the same way, for selecting output of the first FIFO memory 3 and the second FIFO memory 8 sequentially in the order to be converted into the analog output signal by the D/A converter 6, selected one of the first and the second FIFO memory being supplied with a read clock signal synchronized with the clock signal of the D/A converter 6.

Figure 3:
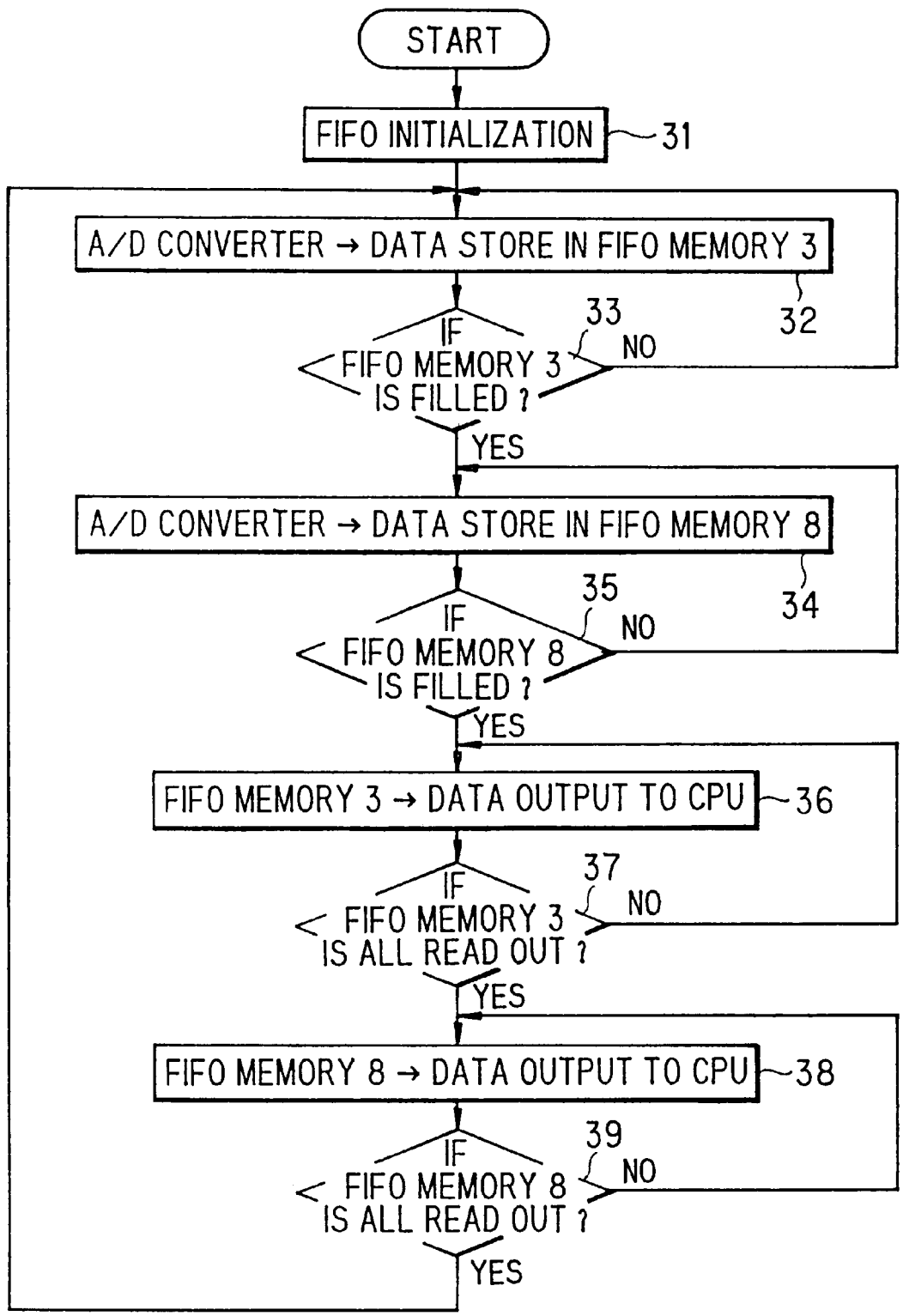
FIG. 3 is a flowchart illustrating operational steps in the recording mode of the embodiment of FIG. 1.

Now, operation of the embodiment in the recording mode, for processing the 16 bit digital data sampled and converted at a sampling frequency of 48 KHz, for example, by the A/D converter 1, is described referring to a flowchart of FIG. 3.

At the beginning of recording operation, the first and the second FIFO memory 3 and 8 are initialized (at step 31). Then, output of the A/D converter 1 is stored successively in the first FIFO memory 3 (at step 32). That is, the FIFO memory timing controller 10 controls the first and the third selector 2 and 7 to select output of the A/D converter 1 to be supplied to the first and the second memory 3 and 8 and enables the first FIFO memory 3 by supplying the write clock signal of 48 KHz thereto, disabling writing operation of the second FIFO memory 8 and reading operation of the first and the second FIFO memory 3 and 8 by fixing the write clock signal of the second FIFO memory 8 and the read clock signals of the first and the second FIFO memory 3 and 8 at logic '0' or logic '1'.

When the first FIFO memory 3 is filled with data of 16 samplings (at step 33), the FIFO memory timing controller 10 enables the second FIFO memory 8 in turn of the first FIFO memory 3 (at step 34) for storing output of the A/D converter 1, by fixing the write clock signal of the first FIFO memory 3 at logic '0' or logic '1' and supplying the write clock signal of 48 KHz to the second FIFO memory 8.

When the second FIFO memory 8 is also filled with data of 16 samplings (at step 35), the second selector 4 is controlled by the FIFO memory timing controller 10 to select output of the first FIFO memory 3 to be transferred to the CPU through the bus controller 5. The FIFO memory timing controller 10 also enables the reading operation of the first FIFO memory 3 by supplying the read clock signal thereto synchronized with the data transfer rate of the bus lines, fixing the read clock signal of the second FIFO memory 8 and write clock signals of the first and the second FIFO memory 3 and 8 at logic '0' or logic '1'. Thus, data stored in the first FIFO memory 3 are transferred to the CPU through the bus controller 5 (at step 36).

When the data stored in the first FIFO memory 3 are all transferred to the CPU (at step 37), data stored in the second FIFO memory 8 are read out and transferred (at step 38) following the data read out of the first FIFO memory 3, the read clock signal of the second FIFO memory enabled in turn of that of the first FIFO memory 3.

When the data stored in the second FIFO memory 8 are all transferred to the CPU (at step 39), control flow returns to step 31 for repeating steps 32 to 39 until the end of the recording operation.

As previously described in connection with the conventional apparatus of FIG. 6, data transfer to the CPU, that is, processes of steps 36 to 39 of FIG. 3 in the embodiment can be performed at a sufficiently high speed compared to the sampling frequency of the A/D converter 1. Therefore, data of 32 samplings stored in the first and the second FIFO memory 3 and 8 are transferred to the CPU sequentially at once with one access to the CPU, without interrupting writing operation of data of any sampling of the A/D converter 1, also in the embodiment.

Figure 4:
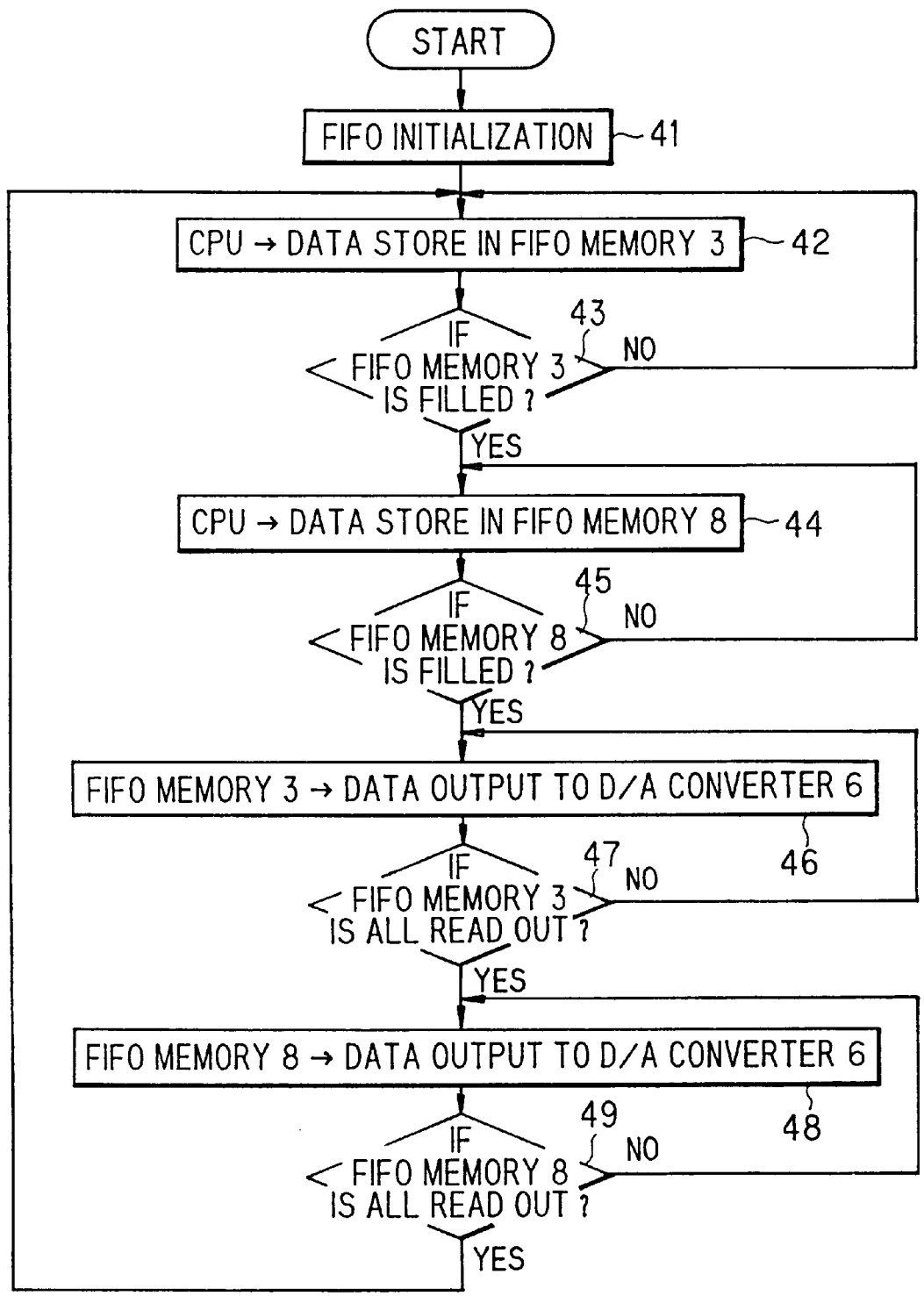
FIG. 4 is a flowchart illustrating operational steps in the reproduction mode of the embodiment of FIG. 1.

FIG. 4 is a flowchart illustrating operation of the embodiment in the reproduction mode for reproducing the analog outout signal to be output by converting data transferred from the CPU by the D/A converter 6 according to clock frequency of 48 KHz.

Referring to FIG. 4, the first and the second FIFO memory 3 and 8 are initialized (at step 41) at the beginning of reproducing operation. Then, data transferred from the CPU are stored in the first FIFO memory 3 (at step 42). That is, the FIFO memory timing controller 10 controls the first and the third selector 2 and 7 to select the data transferred from the CPU through the bus controller 5 to be supplied to the first and the second FIFO memory 3 and 8 and enables the first FIFO memory 3 by supplying the write clock signal thereto synchronized with data transfer rate of the bus lines, disabling writing operation of the second FIFO memory 8 and reading operation of the first and the second FIFO memory 3 and 8 by fixing the write clock signal of the second FIFO memory 8 and the read clock signals of the first and the second FIFO memory 3 and 8 at logic '0' or logic '1'.

When the first FIFO memory 3 is filled with data of 16 samplings (at step 43), the FIFO memory timing controller 10 enables the second FIFO memory 8 in turn of the first FIFO memory 3 (at step 44) for storing data supplied through the bus controller 5, by fixing the write clock signal of the first FIFO memory at logic '0' or logic '1' and supplying the write clock signal synchronized with the data transfer rate of the bus lines to the second FIFO memory 8.

When the second FIFO memory 8 is also filled with data of 16 samplings (at step 45), the fourth selector 9 is controlled by the FIFO memory timing controller 10 to select output of the first FIFO memory 3 to be supplied to the D/A converter 6. The FIFO memory timing controller 10 also enables the reading operation of the first FIFO memory 3 by supplying the read clock signal of 48 KHz thereto, fixing the read clock signal of the second FIFO memory 8 and write clock signals of the first and the second FIFO memory 3 and 8 at logic '0' or logic '1'. Thus, data stored in the first FIFO memory 3 are supplied successively to the D/A converter 6 synchronized with the clock frequency thereof (at step 46).

When the data stored in the first FIFO memory 3 are all supplied to the D/A converter 6 (at step 47), data stored in the second FIFO memory 8 are read out and supplied to the D/A converter 6 (at step 48) following the data read out of the first FIFO memory 3, the read clock signal of the second FIFO memory enabled in turn of that of the first FIFO memory 3.

When the data stored in the second FIFO memory 8 are all read out and supplied to the D/A converter 6, control flow returns to step 41 for repeating steps 42 to 49 until the end of the reproducing operation.

Here also, data transfer from the CPU, that is, processes of steps 42 to 45 of FIG. 4 is performed at a sufficiently high speed compared to the clock frequency of 48 KHz of the D/A converter 6. Therefore, data of 32 samplings to be stored in the first and the second FIFO memory 3 and 8 are transferred sequentially from the CPU at once with one access, which are supplied to the D/A converter 6 successively in order according to the clock frequency of 48 KHz without any interruption, in the reproduction mode.

As heretofore described, the data of 32 samplings are transferred to the CPU with one access in the recording mode, and transferred from the CPU with one access in the reproduction mode, making use of both the first and the second FIFO memory 3 and 8 each having the memory space of 16 samplings in the recording mode and the reproduction mode.

Therefore, access frequency to the CPU can be reduced into a half of that of the conventional apparatus wherein only data of one FIFO memory, 16 samplings in the example, are transferred with each access to the CPU.

Even when the data transfer from/to the CPU is performed according to the DMA (Dynamic Memory Access) transfer method, preparation for the DMA transfer and returning therefrom take a certain overhead of the CPU which is ranking with or more than the data transfer itself.

So, data transfer efficiency can be improved, about two times in an example, by reducing the access frequency to the CPU into a half, according to the FIFO memory control method of the embodiment making use of both the first and the second FIFO memory 3 and 8 sequentially, in the recording mode and the reproducing mode.

Figure 6:
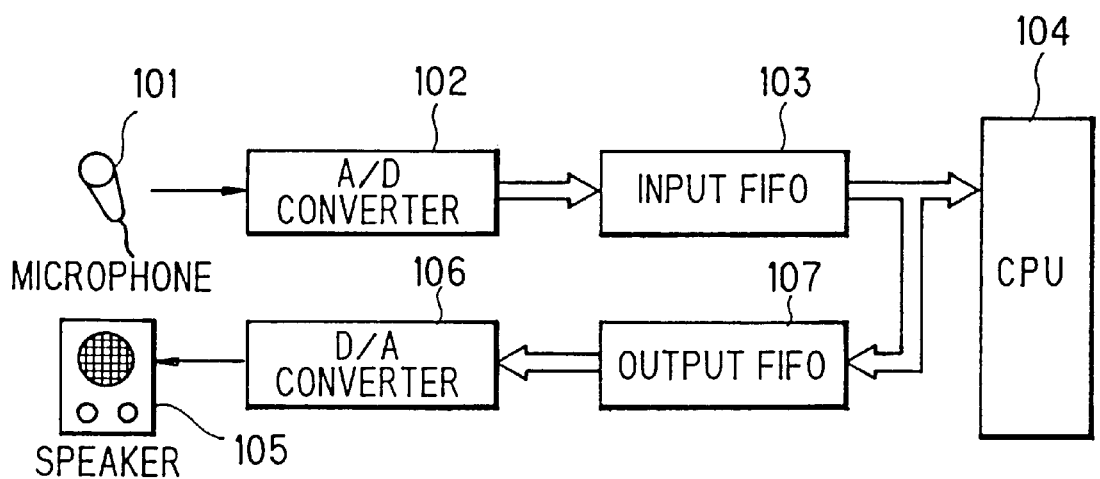
FIG. 6 is a block diagram illustrating an example of the conventional FIFO memory control systems.

When the apparatus is used for recording a sound signal and output another sound signal simultaneously, the first FIFO memory 3 and the second FIFO memory 8 are controlled each for buffering each of the recording data and the reproducing data in the same way to the conventional example of FIG. 6, and duplicated description is omitted.

Figure 5:
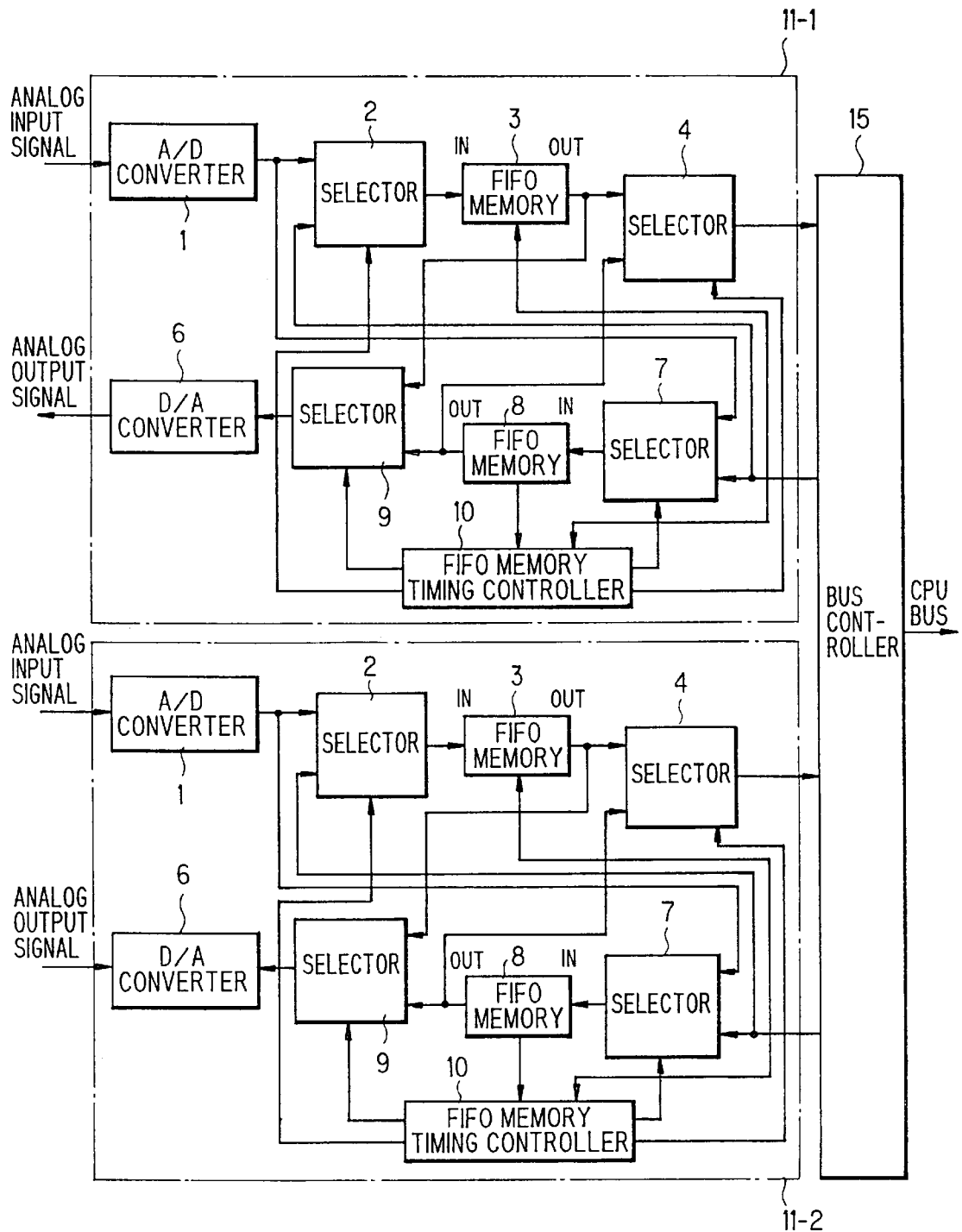
FIG. 5 is a block diagram illustrating another embodiment of the invention.

FIG. 5 is a block diagram illustrating another embodiment of the invention, wherein comprised a first FIFO memory control unit 11-1 and a second FIFO memory control unit 11-2, each having the same configuration with the embodiment of FIG. 1 for recording or reproducing each of two channels of audio signals, two channel stereo signals, for example, except for the bus controller 5 of FIG. 1.

A bus controller 15 takes charge of controlling usage of the first and the second FIFO memory control unit 11-1 and 11-2 according to channel designation commands from the CPU, replacing the bus controller 5 of FIG. 5 thereof. Other parts of each of the first and the second FIFO control unit 11-1 and 11-2 operate in the same way with the embodiment of FIG. 1, duplicated description being omitted.

What is claimed is:

1. A control system of FIFO memories applied in an apparatus for recording first digital audio data converted from a first analog signal and reproducing a second analog signal converted from second digital audio data; said control system comprising control means for:

controlling a first FIFO memory and a second FIFO memory to store the first digital audio data sequentially and to output the first digital audio data stored in said first FIFO memory and said second FIFO memory sequentially when the apparatus is used exclusively for recording the first digital audio data;

controlling said first FIFO memory and said second FIFO memory to store the second digital audio data sequentially and to output the second digital audio data stored in said first FIFO memory and said second FIFO memory sequentially when the apparatus is used exclusively for reproducing the second digital audio data; and controlling each of said first FIFO memory and said second FIFO memory to store each of the first digital audio data and the second digital audio data, respectively, and to output corresponding each of the first digital audio data and the second digital audio data stored in said each of the first FIFO memory and the second FIFO memory, respectively, when the apparatus is used for recording the first digital audio data and reproducing the second digital audio data simultaneously.

2. The control system of FIFO memories recited in claim 1; said control means comprising:

a first selector for selecting one of the first digital audio data and the second digital audio data to be stored in said first FIFO memory;

a second selector for selecting said first digital audio data output from one of said first FIFO memory and said second FIFO memory to be recorded;

a third selector for selecting one of the first digital audio data and the second digital audio data to be stored in said second FIFO memory;

a fourth selector for selecting said second digital data output from one of said first FIFO memory and said second FIFO memory to be reproduced; and a FIFO memory timing controller for controlling said first selector, said second selector, said third selector and said fourth selector, and supplying a write clock signal and a read clock signal to each of said first FIFO memory and said second FIFO memory according to usage of the apparatus.

3. The control system of FIFO memories recited in claim 2; wherein:

said first selector and said third selector are controlled to select the first digital data and said first FIFO memory and said second second FIFO memory are supplied sequentially with said write clock signal synchronized with a sampling frequency of the first digital audio data for storing the first digital audio data, and said second selector is controlled to select said first digital data output from the first FIFO memory and said second FIFO memory sequentially for outputting the first digital audio data stored in said first FIFO memory and said second FIFO memory sequentially, said first FIFO memory and said second FIFO memory being supplied sequentially with said read clock signal synchronized with a data transfer rate of the first digital data to be recorded, when the apparatus is used exclusively for recording the first digital data; and said first selector and said third selector are controlled to select the second digital data and said first FIFO memory and said second second FIFO memory are supplied sequentially with said write clock signal synchronized with said data transfer rate of the second digital audio data to be reproduced for storing the second digital audio data, and said fourth selector is controlled to select said second digital data output from the first FIFO memory and said second FIFO memory sequentially for outputting the second digital audio data stored in said first FIFO memory and said second FIFO memory sequentially, said first FIFO memory and said second FIFO memory being supplied sequentially with said read clock signal synchronized with said sampling frequency of the second digital audio data to be reproduced, when the apparatus is used exclusively for reproducing the second digital data.

* * * * *